US010715486B2

(12) United States Patent
Ossipov et al.

(10) Patent No.: US 10,715,486 B2
(45) Date of Patent: Jul. 14, 2020

(54) PORT ADDRESS TRANSLATION SCALABILITY IN STATEFUL NETWORK DEVICE CLUSTERING

(71) Applicant: Cisco Technology, Inc., San Jose, CA (US)

(72) Inventors: Andrew E. Ossipov, Lewisville, TX (US); Kent Leung, Palo Alto, CA (US); Zhijun Liu, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 226 days.

(21) Appl. No.: 15/890,922

(22) Filed: Feb. 7, 2018

(65) Prior Publication Data

US 2019/0245828 A1 Aug. 8, 2019

(51) Int. Cl.
*H04L 29/12* (2006.01)

(52) U.S. Cl.
CPC ...... *H04L 61/2061* (2013.01); *H04L 61/2514* (2013.01); *H04L 61/2517* (2013.01)

(58) Field of Classification Search
CPC .......... H04L 61/2061; H04L 61/2517
See application file for complete search history.

(56) References Cited

U.S. PATENT DOCUMENTS

| 7,356,045 | B2 | 4/2008 | Satapati et al. | |
|---|---|---|---|---|
| 8,725,898 | B1* | 5/2014 | Vincent | H04L 61/2061 709/238 |
| 8,812,730 | B2 | 8/2014 | Vos et al. | |
| 8,942,235 | B1* | 1/2015 | Vinapamula Venkata | H04L 63/02 370/254 |
| 9,083,587 | B2* | 7/2015 | Babu | H04L 29/12367 |
| 9,203,753 | B2 | 12/2015 | Leung et al. | |
| 9,258,272 | B1* | 2/2016 | Durand | H04L 61/2517 |
| 2010/0303078 | A1* | 12/2010 | Karir | H04L 29/12028 370/392 |
| 2013/0067110 | A1* | 3/2013 | Sarawat | H04L 61/2517 709/238 |
| 2013/0185404 | A1* | 7/2013 | Patel | H04L 61/2557 709/222 |

* cited by examiner

*Primary Examiner* — Aaron N Strange
(74) *Attorney, Agent, or Firm* — Edell, Shapiro & Finnan, LLC

(57) ABSTRACT

A method is performed by a master network device among network devices of a cluster. The master network device receives cluster configuration information including a set of Internet Protocol (IP) addresses and a pool of port blocks associated with the IP addresses. Each port block includes multiple ports, and the pool of the port blocks is to be shared across and used by the network devices for port address translation on network connections with the network devices. The master network device divides the port blocks in the pool into multiple buckets. The master network device first allocates to each network device in the cluster a corresponding one of the buckets, and reserves each bucket that is not allocated for allocation to a potential new network device. When a new network device joins the cluster, the master network device second allocates to the new network device the port blocks from a corresponding one of the reserved buckets.

20 Claims, 14 Drawing Sheets

US 10,715,486 B2

PORT ADDRESS TRANSLATION SCALABILITY IN STATEFUL NETWORK DEVICE CLUSTERING

TECHNICAL FIELD

The present disclosure relates to managing ports for port address translation in a network device cluster.

BACKGROUND

Clients of a private network may exchange data packets with servers connected to a public network through a cluster of distributed network devices (i.e., cluster members), which apply network security rules to the packets, for example. The network devices may employ Port Address Translation (PAT) on the packets. It is generally difficult to scale PAT across the network devices when the cluster is configured with a single Internet Protocol (IP) address pool in which the IP addresses are allocated to the cluster members on fixed, per-IP address basis, especially when stateful processing of the packets is involved. Dynamic PAT sessions are typically created and terminated on a per-connection basis, so all cluster members must continuously exchange PAT IP allocation data to accommodate for potential flow asymmetry within a connection. Conventionally, each cluster member uses an allocated, fixed set of IP addresses from a PAT pool to service all transit connections which happen to load-balance to a particular cluster member, which results in the following operational problems.

First, a potential resource starvation problem may be created on cluster members joining or re-joining the cluster. Since all pool IP addresses are always allocated, a new or a re-joining member may not receive an allocation until a pre-allocated PAT IP address is freed up; thus, depending on the nature of traffic transiting the cluster, a cluster member may have to wait a rather long time for such an allocation. Furthermore, an administrator cannot practically predict the state of allocation before actually attempting to join a new member into the cluster due to a lack of visibility into the allocation process inside of the cluster. Second, multiple different connections from a single client may be distributed to different cluster members and therefore use different mapped IP addresses; this disrupts many client/server-based web applications, which expect all related connections from a single client to use a single source IP address.

DESCRIPTION OF EXAMPLE EMBODIMENTS

Overview

In one embodiment, a method is performed by a master network device among network devices of a cluster. The master network device receives cluster configuration information including a set of Internet Protocol (IP) addresses and a pool of port blocks associated with the IP addresses. Each port block includes multiple ports, and the pool of the port blocks is to be shared across and used by the network devices for port address translation on network connections with the network devices. The master network device divides the port blocks in the pool into multiple buckets of the port blocks, such that each bucket includes an initial number of the port blocks. The master network device first allocates to each network device in the cluster a corresponding one of the buckets, and reserves each bucket that is not allocated for allocation to a potential new network device. When a new network device joins the cluster, the master network device second allocates to the new network device the port blocks from a corresponding one of the reserved buckets.

DETAILED DESCRIPTION

Figure 1:
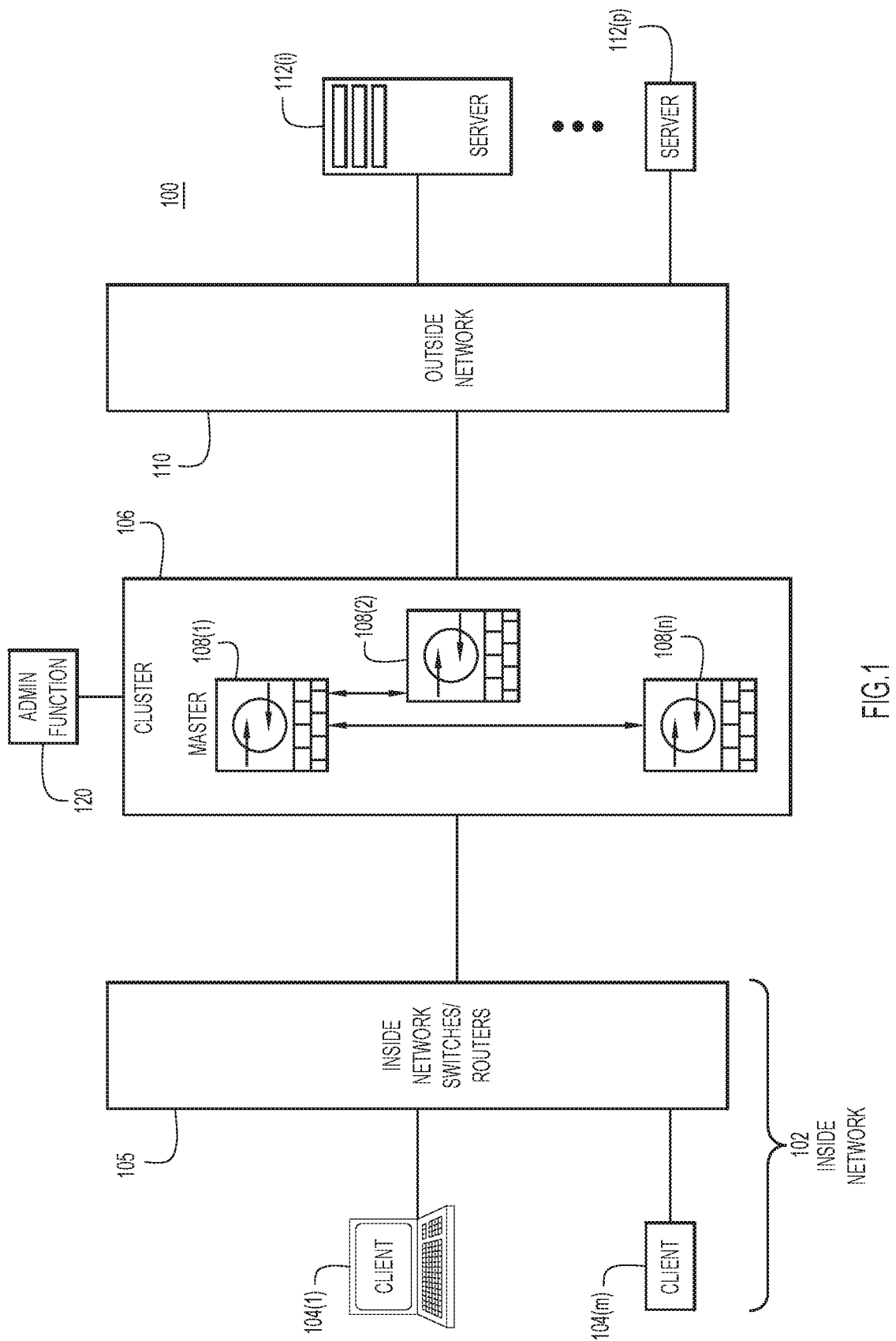
FIG. 1 is a network environment in which embodiments directed to managing port blocks for PAT in a cluster of network devices may be implemented, according to an example embodiment.

With reference to FIG. 1, there is shown an example network environment 100 in which embodiments directed to managing port blocks for PAT in a cluster of network devices may be implemented. Network environment 100 includes an inside network 102 including client devices 104(1)-104(m) (also referred to as "clients 104") connected to each other via one or more inside network switches and/or routers 105, a cluster 106 of network devices 108(1)-108(n) (also referred to as "nodes" and "members" of the cluster) that communicate with client devices via the inside network, an outside network 110, server devices 112(1)-112(p) (also referred to as "servers 112") that communicate with the network devices of the cluster via the outside network, and an administration function 120. Inside network 102 may represent a private network including one of more local area networks (LANs) and/or virtual LANs associated with a specific enterprise. Outside network 110 may include one or more public wide area networks (WANs), such as the Internet, and one or more LANs. Network environment 100 also includes an administration function 120 through which an administrator/user may configure/provision, control, and monitor cluster 106. Administration function 120 may include a server that hosts a control application configured to communicate with one or more of network devices 108 (either directly or over a network) and through which the user interacts with network devices 108 of cluster 106. It should be appreciated that cluster 106, clients 104, and servers 112 may each include any number of devices.

Network devices 108 send and receive communications (e.g., "packets") to servers 112 via outside network 110. These communications may originate, for example, from clients 104 of inside network 102 (i.e., from the private network). Alternatively, the communications may originate from network devices 108 themselves. Also, network devices 108 send and receive communications (e.g., "packets") to clients 104 of inside network 102. These communications may originate, for example, from servers 112 or network devices 108 themselves. Thus, communications between servers 112 and clients 104 traverse outside network 110, network devices 108 of cluster 106, and inside network 102. Specifically, such communications traverse network connections established between network devices 108 and each of outside network 110 and inside network 102.

Network devices 108 of cluster 106 may include network security devices, such as firewalls, network security appliances, and the like. Using administration function 120, an administrator configures each network device 108(i) with network security rules, such as an access security list. Then, network device 108(i) enforces the security rules on packets that traverse the network device. Network devices 108 are connected to, and may communicate with, each other within cluster 106, and may establish network connections with inside network 102 (e.g., the private network) and outside network 110 (e.g., the public network). Network devices 108 include physical devices; however, in an embodiment, cluster 106 represents a logical grouping of the network devices. The logical grouping of network devices 108 effectively operates as a single, logical network security device that imposes network security rules/actions on packets flowing through cluster 106 between client devices 104 and servers 112. The administrator may designate/elect one of network devices 108 as a master network device to configure/provision, manage, and control all of the network devices in the logical grouping. The designated master network device (i.e., "the master" of the cluster) exchanges control or management messages with the other non-master network devices 108. The non-master network devices 108(2)-108(n) operate under the control of the master.

Network devices 108 in cluster 106 perform network address translation (NAT) and port address translation (PAT) operations on communications between clients 104 and servers 112, e.g., on packets originating from the clients of the private network and destined for the servers in the public network, and on packets flowing from the servers to the clients. That is, network devices 108 are configured to map private addresses to public addresses, and vice versa. In the ensuing description, each of servers 112 may also be referred to in the singular as "server 112," and each of clients 104 may be referred to in the singular as "client 104." For example, since client 104 resides in the private network, the client may be provisioned with a private network address (e.g., a private Internet Protocol (IP) address). Devices outside of the private network (e.g., server 112) may not be aware of or otherwise have access to the private IP address of client 104. Instead, server 112 might only be aware of a public IP address to which the private IP address is mapped. Without any public association that identifies the (particular) client 104, server 112 may not be able to send communications to the client, because the server does not know the private IP address of the client.

To solve this problem, NAT and PAT techniques may be utilized to create a public association with the private IP address of client 104. Such techniques may be utilized by one of network devices 108 in cluster 106 to associate the private IP address of client 104 with a publicly available IP address that is accessible to server 112, and PAT techniques may be utilized by one of network devices 108 (e.g., the same device that performs the NAT) to associate client 104 with a publicly accessible IP address and port, i.e., a port associated with the public address, that is accessible to server 112. More specifically, one of network devices 108 handling packets flowing between client 104 and sever 112 assigns identifier information, including a public IP address and a public port pair associated with the server, to the packets. The IP address and port may be selected from a pool of IP addresses and ports available to the one of network devices 108. NAT and PAT techniques are generally described in the Internet Engineering Task Force (IETF) Request for Comments (RFC) publication 2663.

As mentioned above, conventional NAT and PAT management techniques allocate IP addresses each to a respective one of network devices 108. That is, the PAT resource allocation is performed at the level of an IP address (a per-IP PAT pool allocation), which results in various problems and disadvantages, as discussed. Accordingly, embodiments presented perform PAT resource management in cluster 106 primarily at a port-level, not simply at the level of an IP address, which offers advantages over the conventional techniques. More specifically, in cluster 106, the designated master (i.e., master network device) translates IP addresses allocated to the cluster in general (i.e. IP addresses not specifically allocated to any particular network device in the cluster) into a large pool of "port blocks" associated with the IP addresses, where each port block includes a predetermined number of respective ports associated with the IP addresses. Then, the master divides the pool of the port blocks into sets or "buckets" of the port blocks, and dynamically allocates the buckets of the port blocks to individual ones of network devices 108 for PAT associated with network connections handled by the network devices. Thus, the single large pool of the port blocks is used concurrently by different network devices of cluster 106 via allocation of the buckets derived from the pool. Additionally, the master reserves one or more of the buckets of the port blocks that is/are not allocated to network devices 108 in anticipation of a new network device joining cluster 106. If more than one network device needs to join, the master may alert an administrator when sufficient port blocks have been reserved to make it safe to add the additional network device(s) without losing any distributed processing advantage.

Different embodiments for dynamically managing port blocks for PAT in cluster 106 are presented herein. Specifically, the different embodiments are each described below in connection with corresponding ones of FIGS. 2, 6, 9, and 13.

Figure 2:
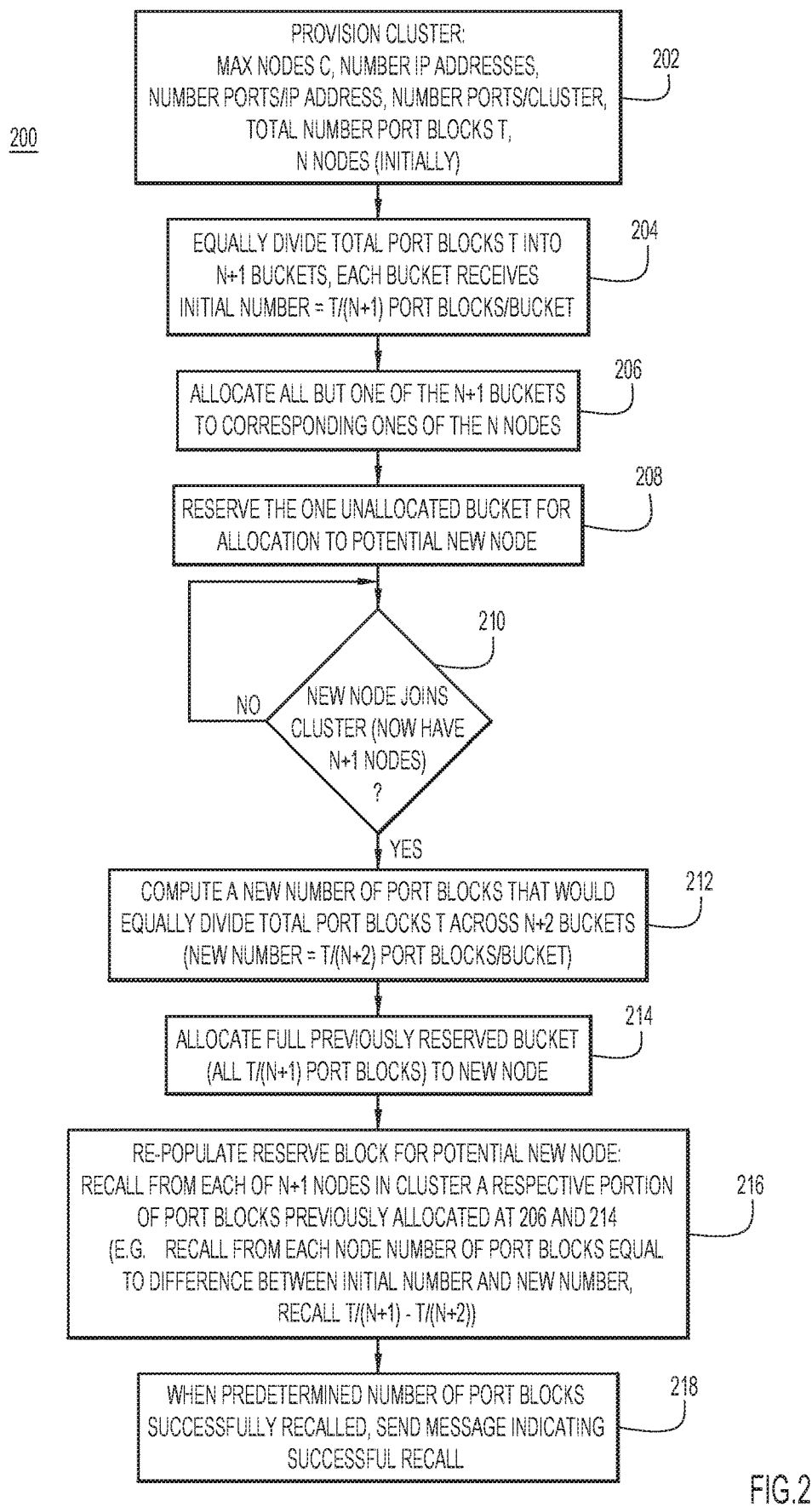
FIG. 2 is a flowchart of a method of dynamically managing a pool of port blocks for PAT performed by a master network device of the cluster, according to an example embodiment.

With reference to FIG. 2, there is a flowchart of an example method 200 of dynamically managing a pool of port blocks for PAT performed by a master network device, e.g., network device 108(1). In the ensuing description, the terms "node" and "nodes" are often used in place of "network device" and "network devices," respectively. Method 200 is referred to as an "N+1" allocation method.

At 202, administration function 120 provisions/configures cluster 106. For example, master node 108(1) receives cluster configuration information from administration function 120. The configuration information configures cluster 106 with the following configurable information:
  a. A set of IP addresses and a range of port addresses (i.e., ports) associated with each IP address that may be used for PAT. The range of port addresses indicates a number of ports associated with each IP address, i.e., a number of ports per IP address. In an example, each port represents a Transmission Control Protocol (TCP)/User Datagram Protocol (UDP) port;
  b. A maximum number of nodes C (i.e., C nodes) that cluster 106 is allowed to accommodate, and a number of nodes N (i.e., N nodes) to be established/configured initially; and
  c. A number of ports per port block.

Based on the above configuration information, master node 108(1) determines a pool of the port blocks to be shared across nodes 108 (i.e., the members) of cluster 106. Master node 108(1) computes a total number (#) T of the port blocks in the pool of the port blocks. To do this, the master node computes:
  a. A total number of ports P for the cluster, according to: P=# of IP addresses x # of ports per IP address; and then
  b. A total number of port blocks T of the pool of the port blocks for the cluster, according to: T=P/(# of ports per block).

Master node 108(1) also computes a number of node vacancies V in the cluster (after the initial N nodes have been configured), according to V=C−N, i.e., C=N+V.

Master node 108(1) initializes/establishes N nodes in cluster 106. This results in N operational nodes 108.

At 204, master node 108(1) equally divides all of the port blocks of the pool of the port blocks (i.e., T port blocks) into N+1 sets or "buckets" of the port blocks. Each bucket includes an initial number of the port blocks that is equal/the same across the N+1 buckets, i.e., the initial number=T/(N+1) port blocks per bucket.

At 206, master node 108(1) allocates all but one (i.e., N) of the N+1 buckets to corresponding ones of the N nodes. To do this, master node 108(1) allocates to itself one of the N+1 buckets, and sends to each other node in cluster 106 a respective port allocation message including an indication of which distinct bucket among the N+1 buckets of the port blocks may be used by the respective node for PAT. The indication specifies the port address range of each port block in the bucket that is allocated to the receiving node. After 206, N of the buckets are allocated to corresponding ones of nodes 108, and one of the buckets is not allocated to any of the nodes. There are several additional factors that may be considered at operations 202-206. A goal is to perform PAT using each IP address across all of nodes 108 (i.e., all cluster members) concurrently. Therefore, it is desirable that the condition of T/(# of IP addresses)>=C to be satisfied. Also, when performing the bucket allocation, each node should receive at least one port block from each IP address. To achieve this, the port blocks associated with each IP address are allocated across nodes 108 so that all of the nodes each receive some (different ones) of the port blocks associated with each given IP address. Additionally, while 204 equally divides the port blocks across all of the buckets so that each receives an equal number of port blocks, in an alternative embodiment, the number of port blocks per bucket may not be equal, but approximately equal. For example, each bucket may receive a respective fraction of the total port blocks that is different from one bucket to the next.

At 208, master node 108(1) reserves the one bucket that is not allocated at 206, i.e., the unallocated bucket, for allocation at a future time to a new node, if/when a new node joins cluster 106. In other words, master node 108(1) reserves the unallocated bucket in anticipation of a new node joining cluster 106.

At 210, master node 108(1) determines whether a new node has joined cluster 106. In an example, master node 108(1) may receive a command from administration function 120 requesting that a new node be configured in cluster 106, which indicates that a new node is about to join the cluster. In response, master node 108(1) initializes the new node, and the new node becomes a member of cluster 106. Assuming the new node has joined the cluster, resulting in N+1 nodes in the cluster, flow proceeds to 212. If a new node has not joined the cluster, flow remains at 210.

At 212, master node 108(1) computes a new number of the total port blocks of the pool to be included in each of N+2 buckets of the port blocks, such that the new number is equal across the N+2 buckets. In other words, master node 108(1) computes a new number that would equally divide the total number T of the port blocks in the pool into N+2 buckets, i.e., the new number=T/(N+2) port blocks per bucket. The new number T/(N+2) is less than the initial number T/(N+1).

At 214, master node 108(1) allocates to the new node the initial number T/(N+1) of the port blocks from the reserved (unallocated) bucket of the port blocks. That is, master node 108(1) allocates the full, previously reserved bucket to the new node. This action depletes the reserve bucket.

At 216, master node 108(1) re-populates the reserved bucket for a potential second new node joining cluster 106. Accordingly, master node 108(1) recalls a number (referred to as a "recall number") of the port blocks previously allocated at operations 206 and 214 from each of the N+1 nodes (i.e., from each of the initial N nodes and the new node). In an example, the recall number is a difference between the initial number and the new number, i.e., the recall number=T/(N+1)−T/(N+2). To recall the port blocks, master node 108(1) sends to each of the N+1 nodes a respective recall message including an indication of the recall number of blocks. Master node 108(1) also waits for a respective acknowledgement message from each of the N+1 nodes indicating that the respective recall number of blocks has been returned to master node 108(1) by each of the nodes that received the respective recall message. Master node 108(1) adds each returned recall number of the port blocks to the reserve bucket, e.g., assigns to the reserve bucket the ranges of port addresses of ports for each of the port blocks that are indicated as returned.

At 218, when master node 108(1) has successfully recalled the recall number of the port blocks from each of nodes 108 to which a respective recall message was sent, the master node sends a message to administration function 120 indicating there are sufficient reserved port blocks in the reserve bucket for another new member to join cluster 106. Operations performed at each of nodes 108 responsive to receipt of the recall message are described below in connection with FIG. 13.

Figure 3:
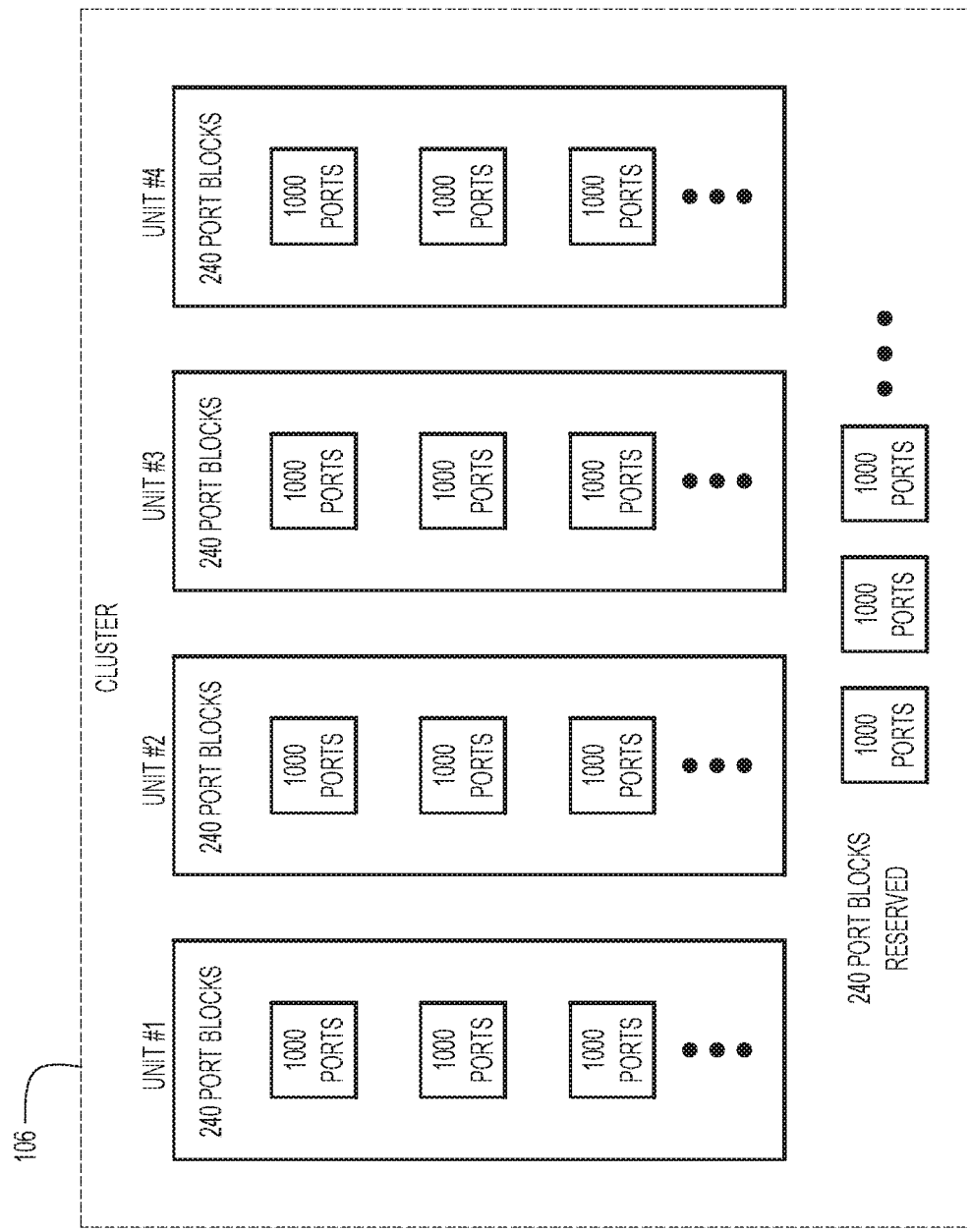
FIG. 3 is an illustration of port block allocation and reservation operations of the method of FIG. 2, based on an initial provisioned configuration of the cluster, according to an example embodiment.
Figure 4:
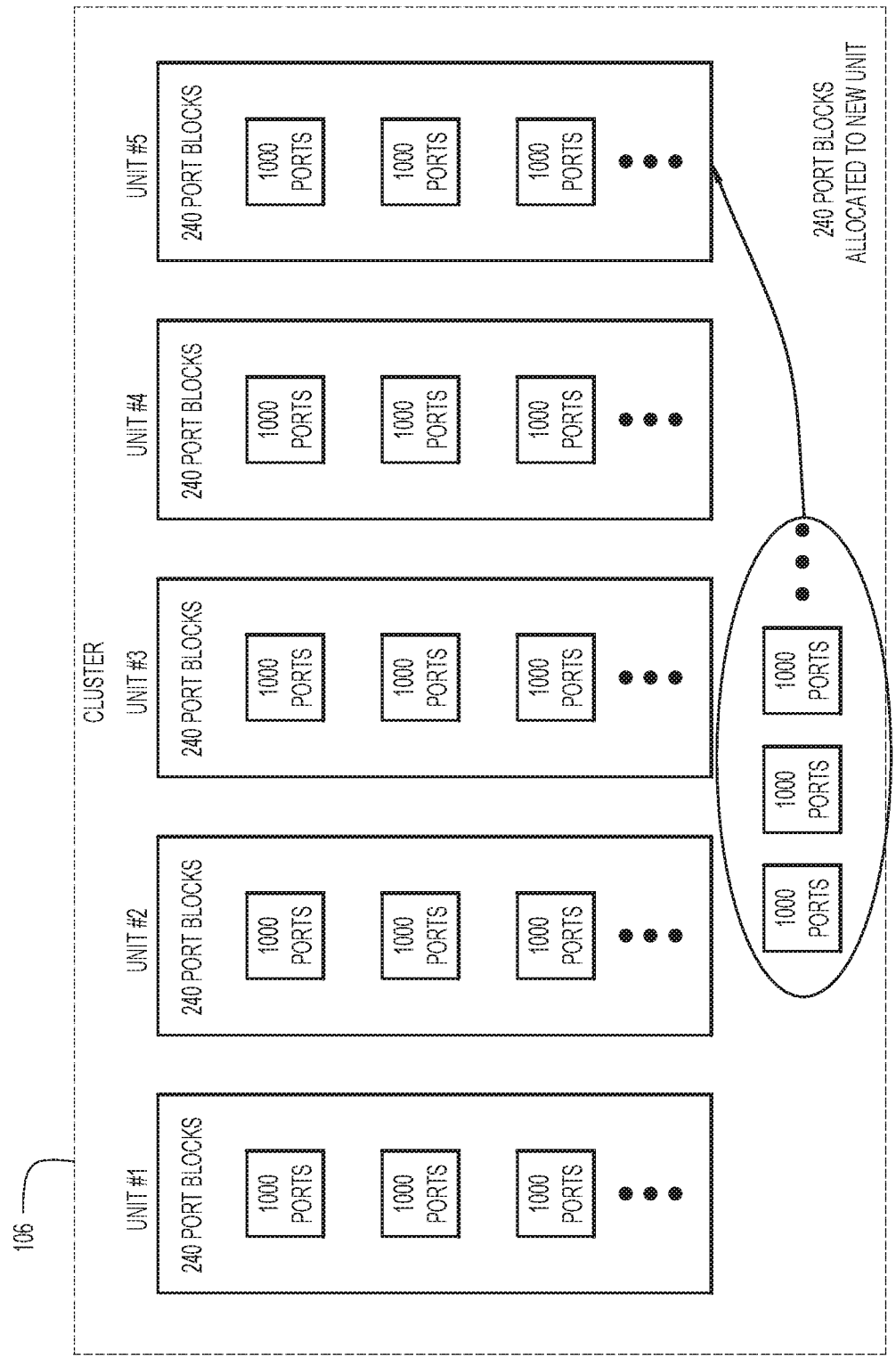
FIG. 4 is an illustration of a port block allocation operation of the method of FIG. 2 when a new network device (i.e., "member") joins the cluster, according to an example embodiment.
Figure 5:
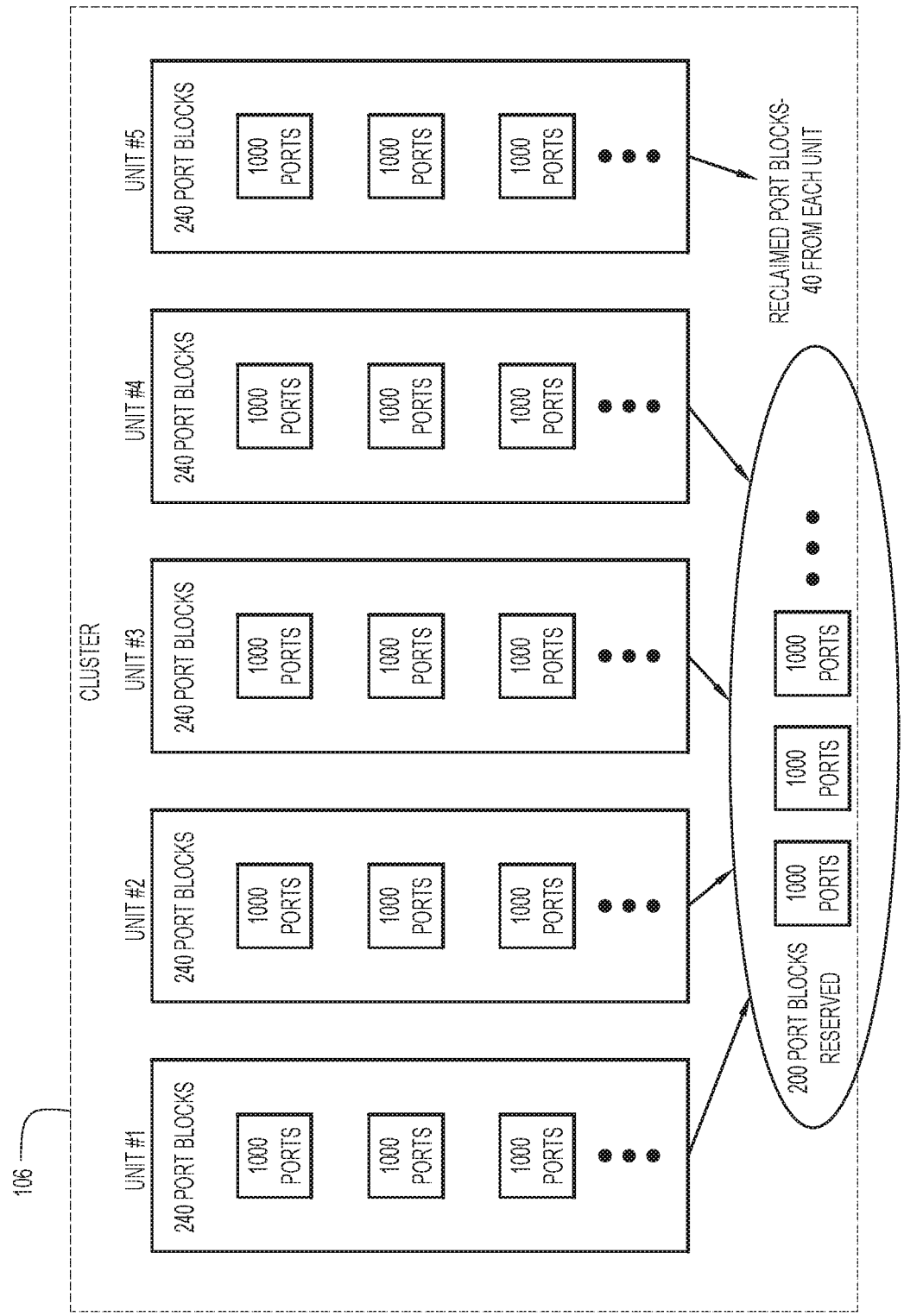
FIG. 5 is an illustration of a port block recall/reclamation operation of the method of FIG. 2 after the new member has been allocated previously reserved port blocks, according to an example embodiment.

Various operations of method 200 correspondingly result in various port block configurations of cluster 106 shown by way of example in FIGS. 3, 4, and 5, described below. In FIGS. 3-5 (and also in FIGS. 7, 8, 10, and 11, described below), the term "unit" is used in place of the term "network device." FIGS. 3-5 assume or are based on an example initial provisioned configuration of cluster 106. In the initial provisioned configuration, cluster 106 is configured for a maximum of C=5 nodes, but operates initially with N=4 nodes. This leaves a vacancy of V=1 available nodes (i.e., room for new members to join). Cluster 106 is configured with 20 IP addresses. The configured number of ports/port block is 1,000, and the number of ports/IP address is 60,000. Thus, the total number of ports for cluster 106 is given by 20 IP addresses×60,000 ports per IP address=1,200,000 ports. The total number T of port blocks in the pool of port blocks is given by 1,200,000 ports÷1000 ports/port block=1200 port blocks. Thus, the total number T of port blocks in the pool is 1200 to be shared across the initial N=4 nodes.

With reference to FIG. 3, there is an illustration of port block allocation and reservation operations 206 and 208 of method 200 based on the above initial provisioned configuration of cluster 106. FIG. 3 shows the initial N=4 nodes as units #1-unit #4 (e.g., network devices 108(1)-108(4)). Each of the 4 nodes stores in local memory the range of port addresses of each of the port blocks in the bucket that are allocated to that node. Moreover, each node tracks which ports in which port blocks are being consumed for PAT in existing connections, and which are not.

Operation 206 of method 200 allocates T/(N+1)=1200/5=240 port blocks to each unit, where each port block includes 1000 ports. Operation 208 reserves 240 blocks in a reserve bucket (indicated at the bottom of FIG. 3).

With reference to FIG. 4, there is an illustration of port block allocation operation 214 of method 200 when a new node (unit #5, e.g., a network device 108(5)) joins cluster 106 after the cluster has been configured as shown in FIG. 3. Operation 214 allocates all 240 port blocks that were reserved as shown in FIG. 3 to the new node (unit #5) that has joined cluster 106.

With reference to FIG. 5, there is an illustration of port block recall/reclamation operation 216 of method 200 after new member (unit #5) has been allocated previously reserved port blocks as shown in FIG. 4, but prior to when a recall of the port blocks from each unit has actually reduced the number of port blocks initially allocated to each unit. Operation 216 recalls T/(N+1)−T/(N+2)=240−200=40 port blocks from each of the 5 units now joined in cluster 106 and deposits each of the reclaimed port blocks in the reserved bucket.

Figure 6:
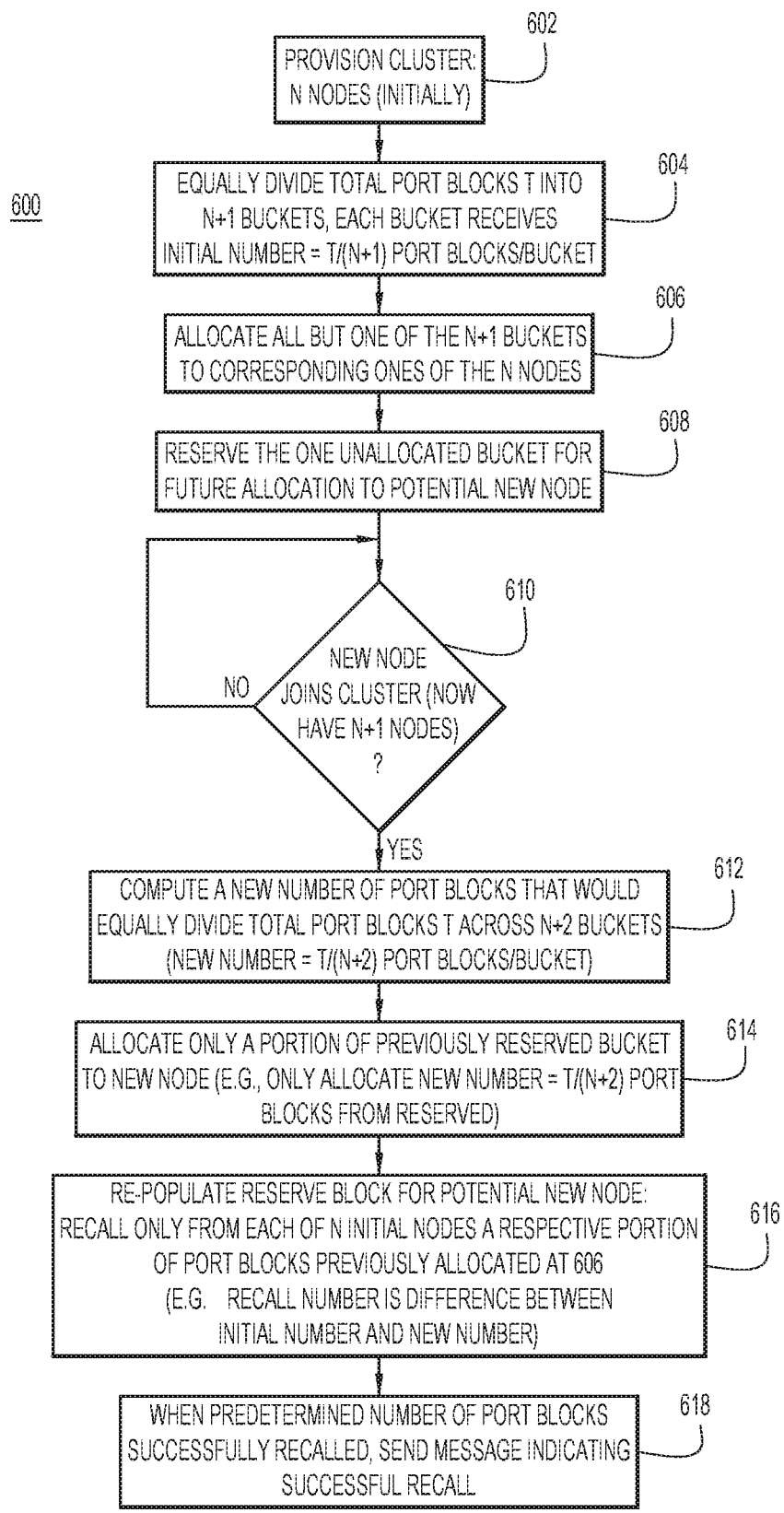
FIG. 6 is a flowchart of another method of dynamically managing a pool of port blocks for PAT performed by the master network device, according to an example embodiment.

With reference to FIG. 6, there is a flowchart of an example method 600 of dynamically managing a pool of port blocks for PAT performed by master node 108(1). Method 600 is the same as method 200, except for differences described below. While method 600 is also referred to as an "N+1" allocation method, N+1 allocation method 600 differs slightly from N+1 allocation method 200.

Operations 602-612 are the same as operations 202-212 described above.

At 614, master node 108(1) allocates only a portion of the initial number (T/(N+1)) port blocks from the previously reserved bucket to the new node. For example, master node 108(1) only allocates T/(N+2) reserved port blocks to the new node (assuming C>N+2), instead of the T/(N+1) reserved port blocks allocated in operation 214 of method 200. If C=N+1, all reserved port blocks can be assigned/allocated.

At 616, master node 108(1) recalls the recall number (T/(N+1)−T/(N+2)) of the port blocks previously allocated at operation 606 from each of the initial N nodes, only. That recall number is not be recalled from the new node because only the new number T/(N+2) of the port blocks was allocated to the new node, instead of the initial number T/(N+1) as in method 200.

Operation 618 is substantially the same as operation 218.

Figure 7:
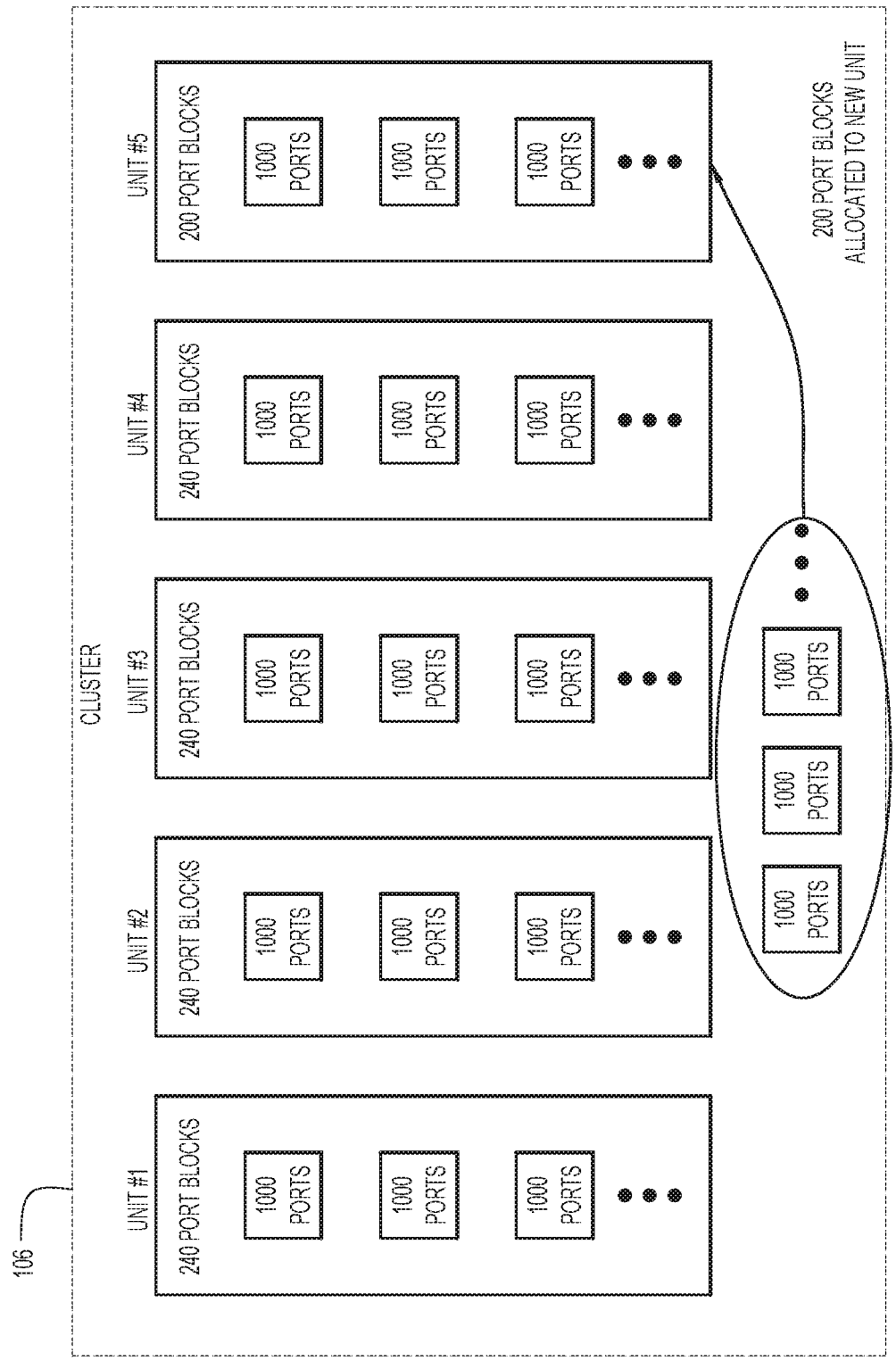
FIG. 7 is an illustration of a port block allocation operation of the method of FIG. 6 when a new member joins the cluster, according to an example embodiment.
Figure 8:
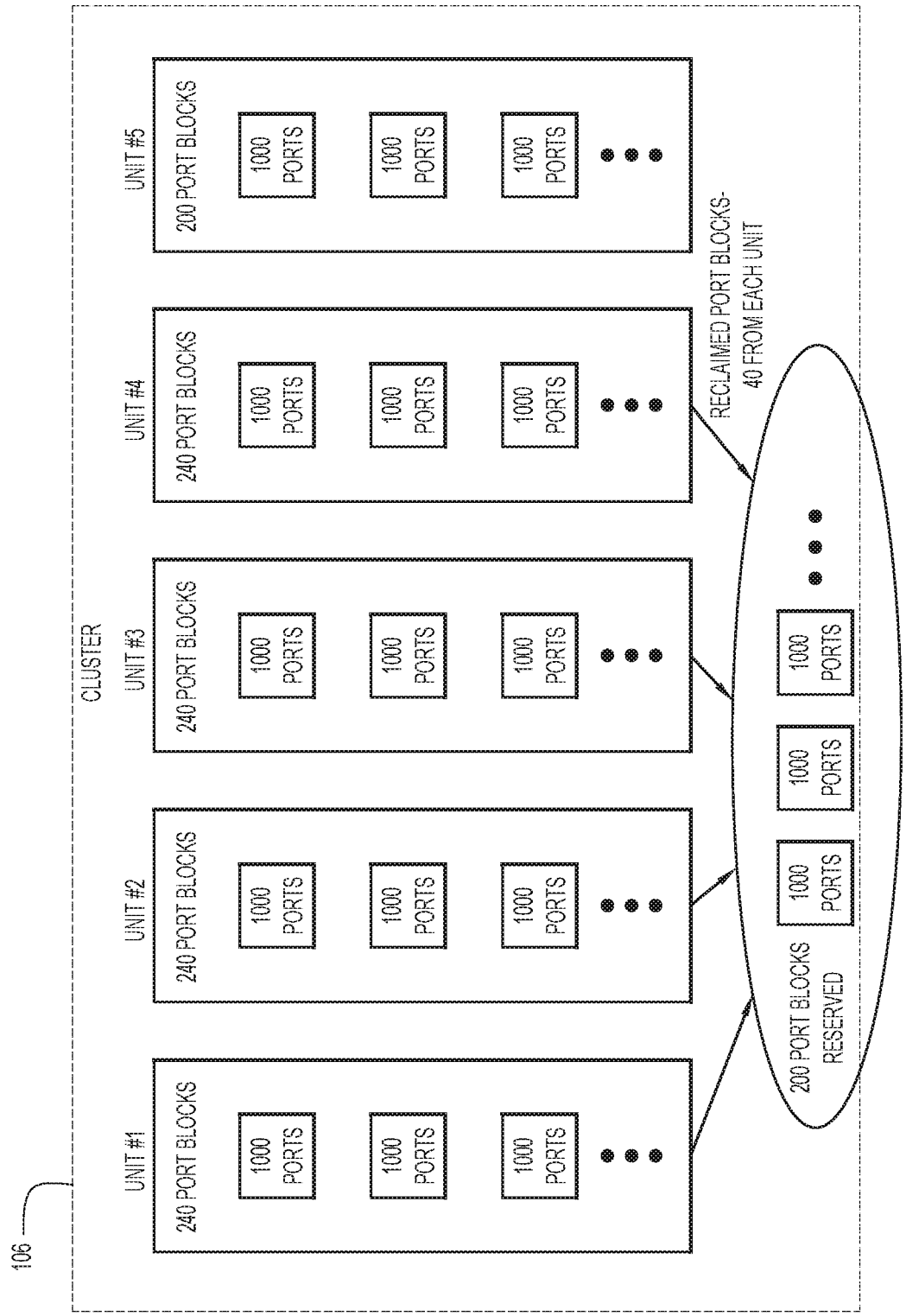
FIG. 8 is an illustration of a port block recall/reclamation operation of the method of FIG. 6 after the new member has been allocated previously reserved port blocks, according to an example embodiment.

Various operations of method 600 are described below in connection with FIGS. 7 and 8. FIGS. 7 and 8 assume the initial provisioned configuration of cluster 106, including operations of method 600 resulting in the port block allocations shown in FIG. 3. That is, FIGS. 7 and 8 essentially continue from FIG. 3.

With reference to FIG. 7, there is an illustration of port block allocation operation 614 of method 600 when a new member (unit #5) joins cluster 106 that has been initially configured as shown in FIG. 3. Operation 614 of method 600 allocates to the new unit (unit #5) that has joined cluster 106 only 200 port blocks (T/(N+2)=1200/6=200) that were previously reserved, instead of the full 240 port blocks that method 200 allocates (as shown in FIG. 4).

With reference to FIG. 8, there is an illustration of port block recall/reclamation operation 616 of method 600 after new member (unit #5) has been allocated 200 previously reserved port blocks at operation 614 (as shown in FIG. 7), but prior to when a recall of the port blocks from each unit has actually reduced the number of port blocks initially allocated to each unit. Operation 616 recalls T/(N+1)−T/(N+2)=240−200=40 port blocks from each of the initial 4 units, but no port blocks from the new member (unit #5).

Figure 9:
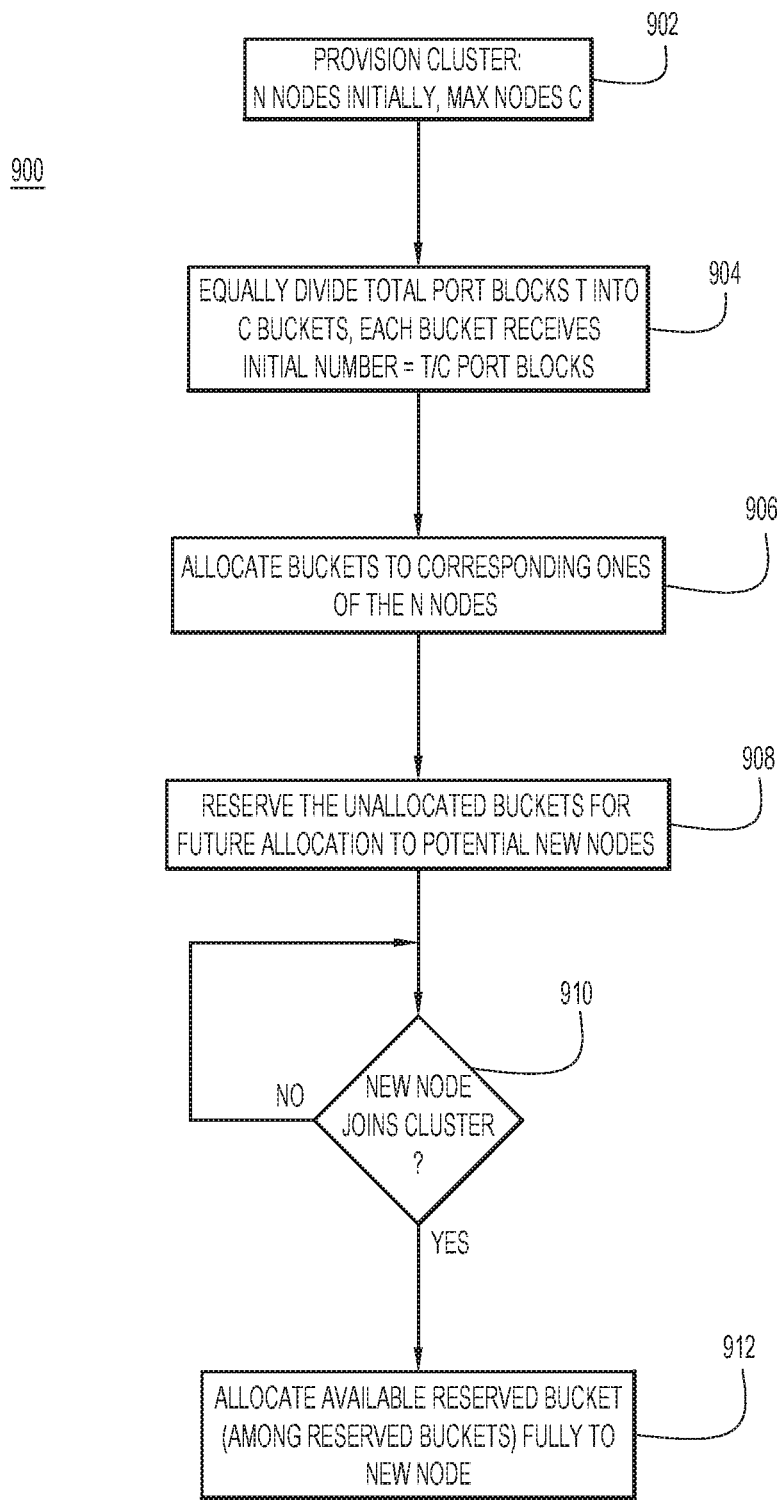
FIG. 9 is a flowchart of another method of dynamically managing a pool of port blocks for PAT performed by the master network device, according to an example embodiment.

With reference to FIG. 9, there is a flowchart of an example method 900 of dynamically managing a pool of port blocks for PAT performed by master node 108(1). Method 904 is referred to as an "N+V" allocation method.

Operation 902 is substantially the same as operation 202 and 602.

At 904, master node 108(1) equally divides all of the port blocks of the pool of the port blocks into C sets or buckets of the port blocks. Each bucket includes an initial number of the port blocks that is equal/the same across the C buckets, i.e., the initial number=T/C port blocks per bucket, where C=N+V.

At 906, master node 108(1) allocates buckets from operation 904 so that each (one) bucket is allocated to a corresponding one of the N nodes.

At 908, master node 108(1) reserves each unallocated bucket from 906 (i.e., the V buckets left over from 906) to a reserve pool for allocation to one or more new nodes that may join cluster 106 in the future.

At 910, master node 108(1) determines whether a new node has joined. If no, flow returns to 910. If yes, flow proceeds to 912.

At 912, if/when a new node joins, master node 108(1) allocates a corresponding one of the reserved buckets (one of the V buckets) to the new node.

Figure 10:
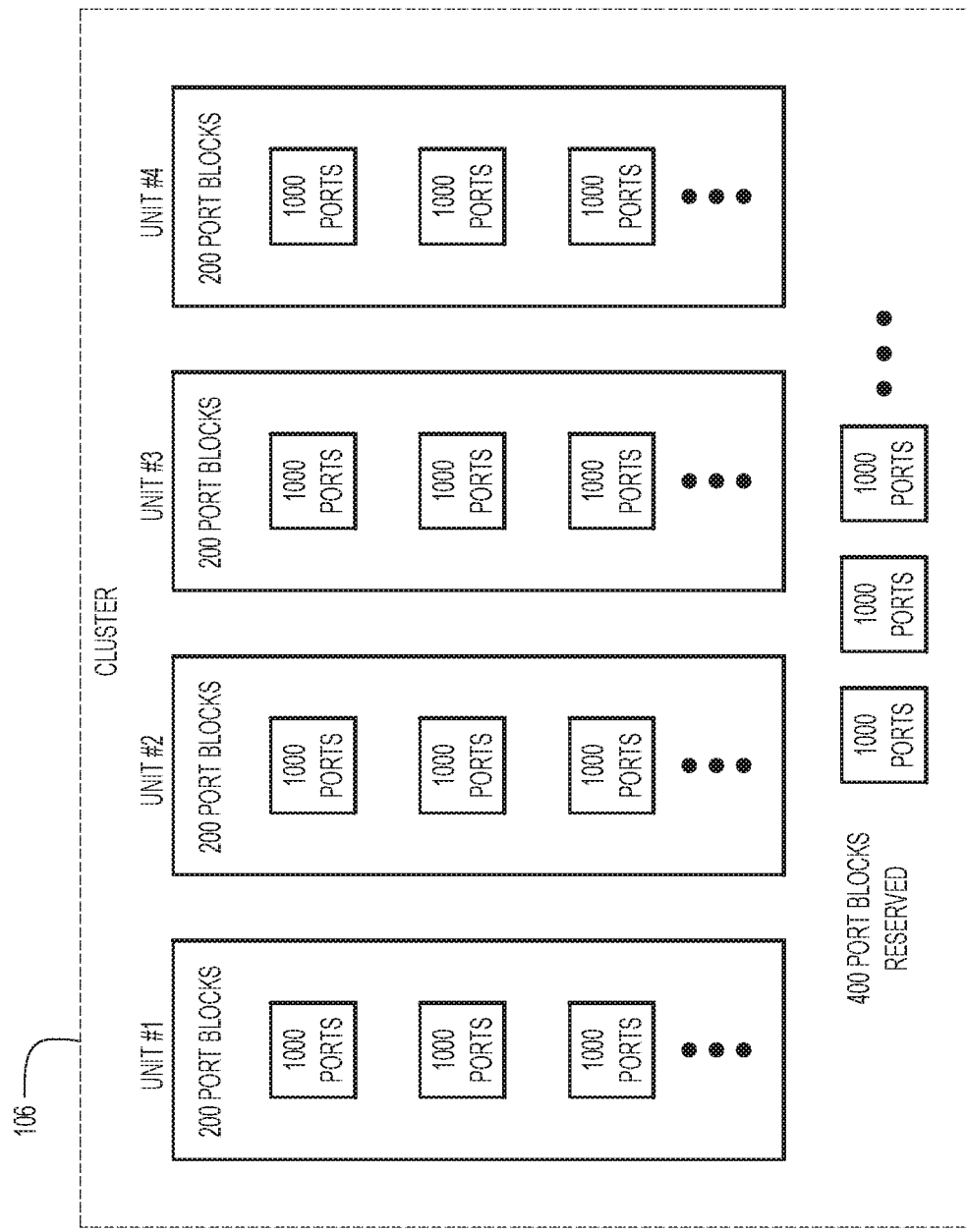
FIG. 10 is an illustration of port block allocation and reservation operations of the method of FIG. 9, according to an example embodiment.
Figure 11:
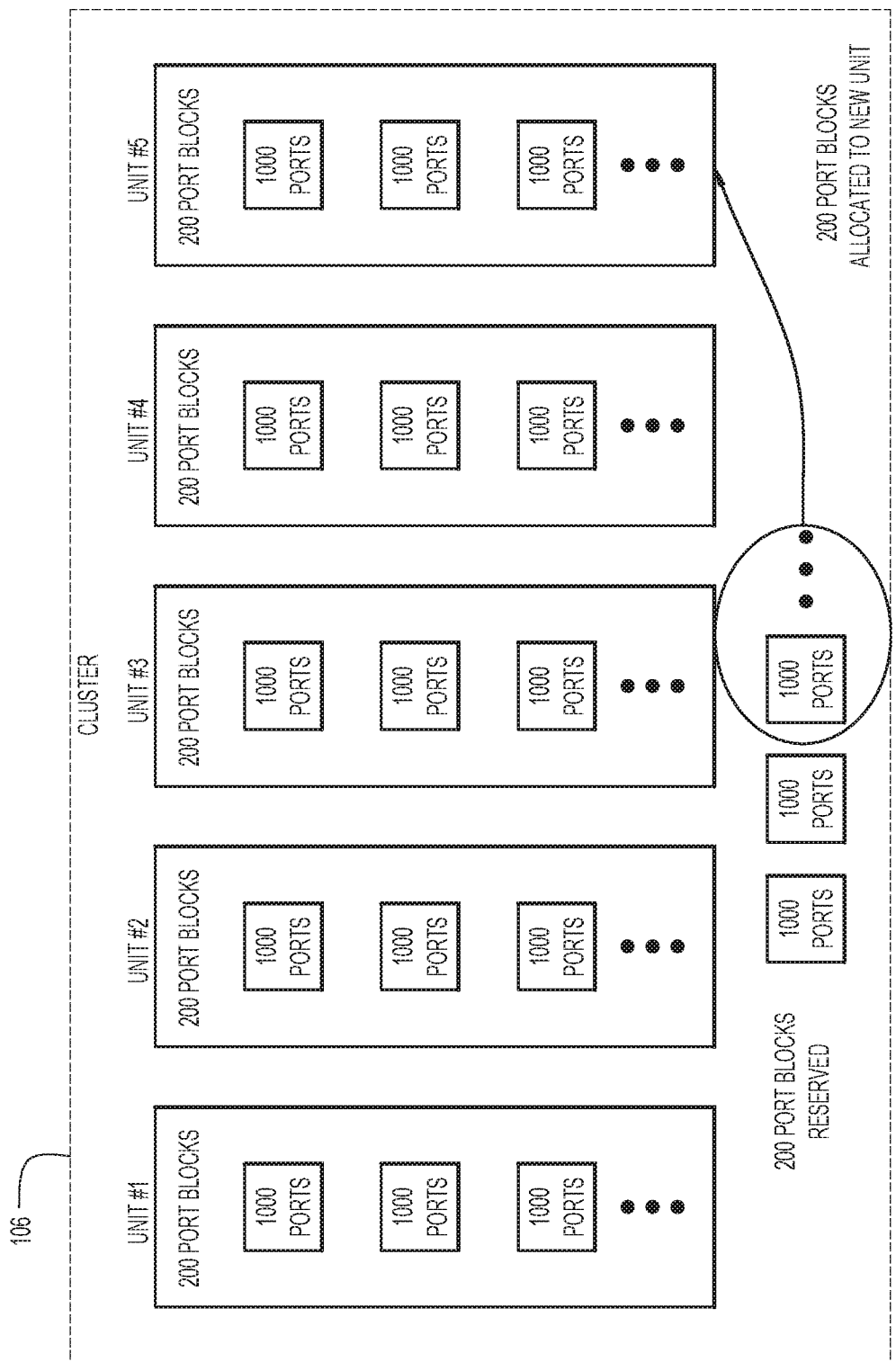
FIG. 11 is an illustration of a port block allocation operation of the method of FIG. 9 when a new network device joins the cluster, according to an example embodiment.

Various operations of method 900 are described below in connection with FIGS. 10 and 11. FIGS. 10 and 11 assume the initial provisioned configuration of cluster 106 described above.

With reference to FIG. 10, there is an illustration of port block allocation and reservation operations 906 and 908 of method 900 based on the above initial provisioned configuration of cluster 106. FIG. 10 shows the initial N=4 nodes as units #1-unit #4 (with C=6).

Operation 906 of method 200 allocates T/C (i.e., T/(N+V))=1200/6=200 port blocks to each of the 4 units. Operation 908 reserves 2 (i.e., V)×200=400 port blocks.

With reference to FIG. 11, there is an illustration of port block allocation operation 912 of method 900 when a new node (unit #5) joins cluster 106 after the cluster has been configured as shown in FIG. 10. Operation 912 allocates 200 of the 400 port blocks that were reserved (as shown in FIG. 10) to the new node (unit #5) that has joined cluster 106. After this allocation, another 200 port blocks remains in reserve for a next node that joins cluster 106.

Figure 12:
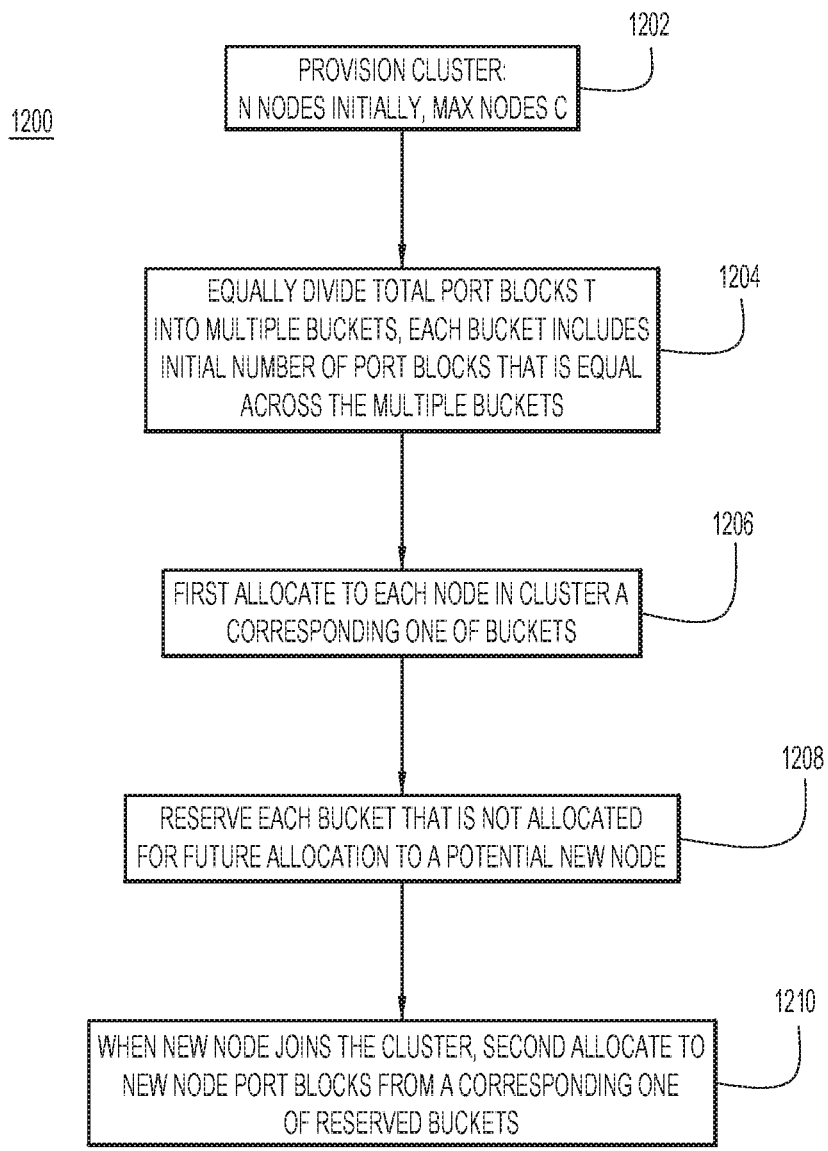
FIG. 12 is a flowchart of a method that incorporates features from the methods of FIGS. 2, 6, and 9, according to an example embodiment.

With reference to FIG. 12, there is a flowchart of an example method 1200 that incorporates features from methods 200, 600, and 900.

Operation 1202 is substantially the same as operation 202.

At 1204, master node 108(1) equally divides the port blocks of the pool of the port blocks into multiple buckets of the port blocks. Each bucket includes an initial number of the port blocks that is equal across the buckets.

At 1206, master node 108(1) allocates to each node in the cluster a corresponding one of the buckets. For example, if there are C nodes and C buckets, one bucket is allocated to each node.

At 1208, master node 108(1) reserves each bucket that is not allocated for allocation to a potential new node.

At 1210, when a new node joins the cluster, master node 108(1) allocates to the new node the port blocks from a corresponding one of the reserved buckets.

Figure 13:
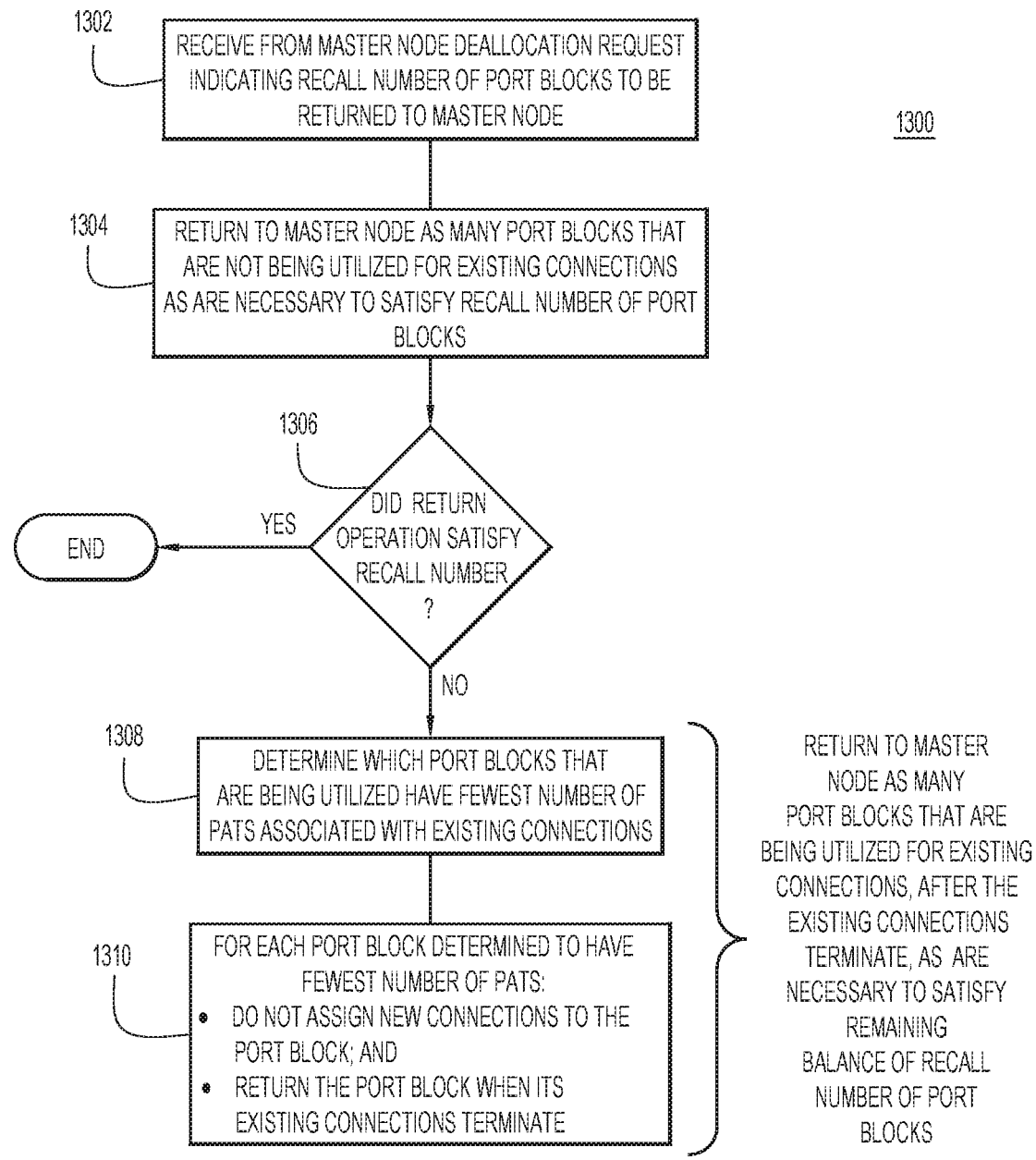
FIG. 13 is a flowchart of a method of responding to a recall message/request issued by a master network device, performed by a non-master network device of the cluster, according to an example embodiment.

With reference to FIG. 13, there is a flowchart of an example method 1300 of responding to a recall message/request issued from a master node (e.g., network device 108(1)), performed by a non-master node (e.g., one of network nodes 108(2)-108(4)) (referred to below in operations 1302-1310 as "the node"). The node tracks which ports in which port blocks are being consumed for PAT in existing connections, and which are not.

At 1302, the node receives from the master node a recall message (also referred to as a "deallocation request") indicating a recall number of port blocks to be returned to the master node.

At 1304, the node returns to the master node as many of the port blocks that are not being utilized by the node for existing connections (e.g., existing PATs) as are necessary to satisfy the recall number of port blocks. To return the port blocks, the node sends a return message to the master node indicating the returned port blocks by their respective port block addresses, for example.

At 1306, the node determines whether it has returned the recall number of port blocks, thus satisfying the request. If yes, method 1300 ends. If no, flow proceeds to 1308.

At 1308, the node determines which of the port blocks that are being utilized have a fewest number of PATs associated with the existing connections. For example, the node determines for each port block that is being utilized a percentage of the ports in the port block (that is being utilized) that are consumed by an existing connection, which produces a respective percentage for/associated with each of the port blocks. Then, the node selects those port blocks associated with a respective percentage that is below a predetermined percentage. The selected port blocks represent the port blocks having the fewest number of PATs among all of the port blocks being utilized for PAT.

At 1310, the node, for each port block determined to have the fewest number of PATs (e.g., each selected port block):

a. Does not assign any new connection(s) to that the ports in that port block; and b. Returns that port block to the master node when all of the existing connections associated with that port block have terminated.

The result of operations 1308 and 1310 is to return to the master node as many of the port blocks that are being utilized for existing connections, after those existing connections terminate, as are necessary to satisfy the balance of the recall number of the port blocks remaining after operation 1304.

Figure 14:
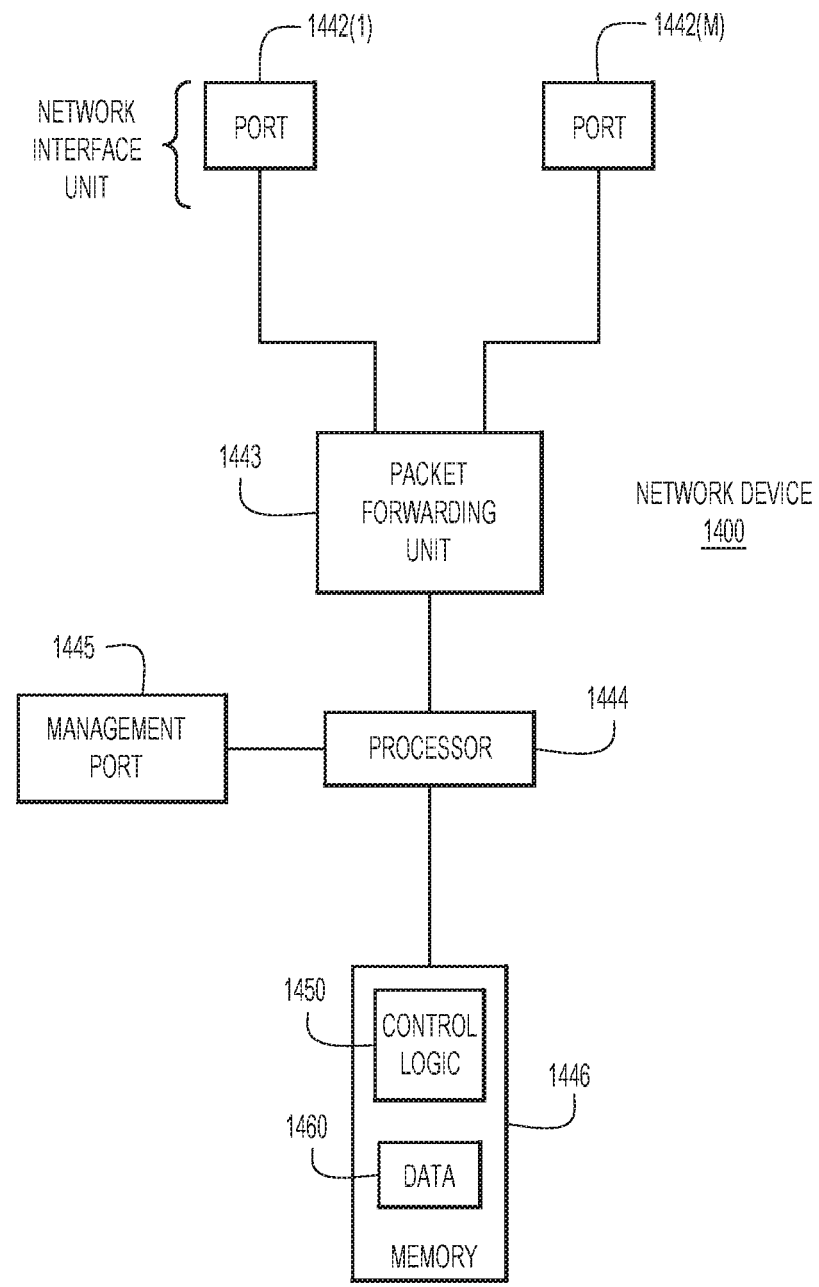
FIG. 14 is a hardware block diagram of a network device, according to an example embodiment.

With reference to FIG. 14, there is a block diagram of an example network device 1400, representative of each of network devices 108, including a master network device and a non-master network device. Network device 1400 may be a router or a switch, or simply a computer device, such as a server. Network device 1400 comprises a network interface unit having a plurality of network input/output (I/O) ports 1442(1)-1442(M) to send traffic (e.g., IP packets) to a network (e.g., network 102 or 110) and receive traffic (e.g., IP packets) from the network, a packet forwarding/processing unit 1443, a network processor 1444 (also referred to simply as "processor"), a management port 1445 to exchange control messages with other network devices and an administration function, and a memory 1446. The packet forwarding/processing unit 1443 is, for example, one or more application specific integrated circuits (ASICs) that include packet buffers, packet queues, and other control logic for performing packet forwarding operations. The processor 1444 is a microcontroller or microprocessor that is configured to perform higher level controls of network device 1400. To this end, the memory 1446 stores software instructions that, when executed by the processor 1444, cause the processor 1444 to perform a variety of operations including operations described herein. For example, the memory 1446 stores instructions for control logic 1450 to perform operations described herein including methods 200, 600, 900, 1200, and 1300, described above. Control logic 1450 may also include logic components in packet forwarding unit 1443. Memory 1446 also stores data 1460 used and generated by logic 1450. Such data may include IP address, port addresses, and address ranges for port blocks, percentages of utilized port blocks, cluster configuration information, and so on, as described above.

In summary, embodiments presented herein include several features. For each IP address in a PAT pool, a cluster master breaks the PAT pool into equal-sized port blocks. The size or number ports of each block configurable. The master evenly distributes the PAT port blocks for each PAT pool IP address across all cluster members, using N+1 as a member (node) count where N is the current cluster size. The master keeps an extra allocation that is unused to accommodate another member joining the cluster. As such, the master itself may take 50% of all port blocks when no other member is present. A user may implicitly configure a maximum cluster size, so the master will stop the pre-allocation when all cluster members are already present.

When a new member joins, the master immediately allocates the previously reserved port blocks to that member. At the same time, the master attempts to reclaim currently reserved blocks in order to accommodate another potentially joining unit. The master may use the same N+1 rule with the new cluster size (N+1) to establish how many PAT port blocks need to be reclaimed. If fewer than necessary free blocks are available across all cluster members, the master requests specific members to mark a required block count (recall number) for deallocation. Alternatively, to speed up another potential new member addition, the master may only allocate T/(N+2) blocks out of the reserved T/(N+1) PAT port block space where T is the total number of port blocks; the master also launches the deallocation process across the cluster to ensure that all members have even PAT resource capacity. The alternative may be generalized as "T/(N+X)" where X is user configurable based on deployment condition for expected units joining the cluster.

Each cluster member that receives a block deallocation request (recall request) from the master determines which port blocks have the fewest allocated translations and stops accommodating new connections using those port blocks. Once the pre-existing translations that use the blocks are terminated, the cluster member will release those free blocks back to the master. Once the master determines that enough free port blocks are available (from recalls) to accommodate another member, the master generates an administrative notification to the user (a syslog, a user interface (UI) indication, or a command line interrupt (CLI) command output) that it is safe to add another member to the cluster. Once a member leaves the cluster, the associated pool blocks are returned to the master for re-allocation among the remaining/existing cluster members.

During normal operation, the user configures specific connections (based on policy criteria such as an IP address or an application identity) that must use a single source IP address. When the first connection for such a class is processed by a cluster member, the allocated IP address for the client host will be replicated to all other cluster members. Doing so, once for all connections from the host, significantly reduces the overhead and the possibility of a race condition. Even if subsequent connections from this host that match the same policy are processed by other cluster members, it will be allocated translations using port blocks that correspond to the same IP address. Once all connections from this host which match the policy are terminated, all cluster members eventually remove the PAT IP mapping for the host after a certain configurable timeout. This removal request may also be triggered by a member that created the original entry and broadcasted it to all cluster members.

In summary, in one aspect, a method is provided comprising: at a master network device among network devices of a cluster: receiving cluster configuration information including a set of Internet Protocol (IP) addresses and a pool of port blocks associated with the IP addresses, each port block including multiple ports, and the pool of the port blocks to be shared across and used by the network devices for port address translation on network connections with the network devices; dividing the port blocks in the pool into multiple buckets of the port blocks, each bucket including an initial number of the port blocks; first allocating to each network device in the cluster a corresponding one of the buckets; reserving each bucket that is not allocated for allocation to a potential new network device; and when a new network device joins the cluster, second allocating to the new network device the port blocks from a corresponding one of the reserved buckets.

In another aspect an apparatus is provided comprising: a network interface including multiple input-output ports configured to communicate with one or more networks; and a processor of a network device among network devices of a cluster, the processor coupled to the network interface and configured to: receive cluster configuration information including a set of Internet Protocol (IP) addresses and a pool of port blocks associated with the IP addresses, each port block including multiple ports, and the pool of the port blocks to be shared across and used by the network devices for port address translation on network connections with the network devices; divide the port blocks in the pool into multiple buckets of the port blocks, each bucket including an initial number of the port blocks; first allocate to each network device in the cluster a corresponding one of the buckets; reserve each bucket that is not allocated for allocation to a potential new network device; and when a new network device joins the cluster, second allocate to the new network device the port blocks from a corresponding one of the reserved buckets.

In yet another aspect, a non-transitory computer readable medium is provided. The computer readable medium is encoded with instructions that, when executed by a processor, of a master network device among network devices of a cluster, cause the processor to perform: receiving cluster configuration information including a set of Internet Protocol (IP) addresses and a pool of port blocks associated with the IP addresses, each port block including multiple ports, and the pool of the port blocks to be shared across and used by the network devices for port address translation on network connections with the network devices; dividing the port blocks in the pool into multiple buckets of the port blocks, each bucket including an initial number of the port blocks; first allocating to each network device in the cluster a corresponding one of the buckets; reserving each bucket that is not allocated for allocation to a potential new network device; and when a new network device joins the cluster, second allocating to the new network device the port blocks from a corresponding one of the reserved buckets.

The above description is intended by way of example only. Various modifications and structural changes may be made therein without departing from the scope of the concepts described herein and within the scope and range of equivalents of the claims.

What is claimed is:
1. A method comprising:
   at a master network device among N network devices of a cluster:
      receiving cluster configuration information including a set of Internet Protocol (IP) addresses and a pool of port blocks associated with the IP addresses, each port block including multiple ports, and the pool of the port blocks to be shared across the N network devices;
      dividing the port blocks in the pool into N+1 buckets of the port blocks, each bucket including an initial number of the port blocks;
      first allocating all but one bucket of the N+1 buckets to corresponding ones of the N network devices;
      reserving as a reserved bucket the one bucket that is not allocated for allocation to a potential new network device;
      when a new network device joins the cluster, second allocating to the new network device at least a portion of the port blocks from the reserved bucket; and
      using the port blocks for port address translation operations for communications between a first network and a second network that traverse the cluster.
2. The method of claim 1, further comprising, when the new network device joins the cluster, resulting in N+1 network devices in the cluster:
   computing a new number of the port blocks of the pool to be included in each of N+2 buckets of the port blocks, wherein the new number is less than the initial number, wherein the second allocating includes allocating to the new network device at least the new number of the port blocks from the reserved bucket.

3. The method of claim 2, further comprising, when the new network device joins the cluster:
recalling from each of the N network devices that were in the cluster prior to when the new network device joins a respective portion of the respective bucket of the port blocks previously allocated by the first allocating; and
reserving the respective portions recalled from the N network devices for allocation to a potential new network device.

4. The method of claim 3, wherein the recalling from each of the N network devices includes recalling from each of the N network devices a recall number of the port blocks that is equal to a difference between the initial number in each of the N+1 buckets and the new number in each of the N+2 buckets.

5. The method of claim 3, further comprising:
determining when a recall number of the port blocks have been successfully recalled from each of the N network devices; and
when the recall number of the port blocks have been successfully recalled from each of the N network devices, sending to an administrator function associated with the cluster an indication that there are sufficient port blocks to support a new network device.

6. The method of claim 2, wherein the second allocating includes allocating to the new network device the initial number of the port blocks from the reserved bucket.

7. The method of claim 6, further comprising:
recalling from each of the N network devices that were in the cluster prior to when the new network device joins a respective portion of the port blocks of the respective bucket previously allocated by the first allocating;
recalling from the new network device a respective portion of the port blocks of the bucket previously allocated by the second allocating; and
reserving the respective portions recalled from the N network devices and the respective portion recalled from the new network device for future allocation to a potential new network device.

8. The method of claim 7, wherein the recalling from each of the N network devices and the recalling from the new network device each include recalling from each network device a number of the port blocks equal to a difference between the initial number in each of the N+1 buckets and the new number in each of the N+2 buckets.

9. The method of claim 1, wherein the cluster is provisioned for a maximum of C network devices and a total number of T port blocks in the pool of the port blocks, and the cluster includes N network devices prior to when the new network device joins the cluster, and wherein the dividing includes dividing the port blocks in the pool into C buckets.

10. The method of claim 1, wherein the dividing includes equally dividing the port blocks in the pool into the N+1 buckets of the port blocks, such that the initial number of the port blocks in each bucket is equal across the buckets.

11. The method of claim 1, further comprising, at a network device among the network devices that is not the master network device and to which the port blocks were allocated in the first allocating, upon receiving from the master network device a deallocation request indicating that a recall number of port blocks are to be returned to the master network device:
returning to the master network device as many of the port blocks that are not being utilized for existing connections as are necessary to satisfy a recall number of the port blocks; and
if the returning did not satisfy the recall number of the port blocks, returning to the master network device as many of the port blocks that are being utilized for the existing connections, after the existing connections terminate, as are necessary to satisfy the recall number of port blocks.

12. The method of claim 11, wherein the returning to the master network device the port blocks that are being utilized further comprises:
determining which of the port blocks that are being utilized have a fewest number of port address translations associated with the existing connections; and
for each port block determined to have the fewest number of port address translations:
not assigning new connections to the port block; and
returning the port block to the master network device when the existing connections associated with the port block have terminated.

13. The method of claim 1, wherein the first network includes a private network and the second network includes a public network.

14. An apparatus comprising:
a network interface including multiple input-output ports configured to communicate with one or more networks; and
a processor of a network device among N network devices of a cluster, the processor coupled to the network interface and configured to:
receive cluster configuration information including a set of Internet Protocol (IP) addresses and a pool of port blocks associated with the IP addresses, each port block including multiple ports, and the pool of the port blocks to be shared across the N network devices;
divide the port blocks in the pool into N+1 buckets of the port blocks, each bucket including an initial number of the port blocks;
first allocate all but one bucket of the N+1 buckets to corresponding ones of the N network devices;
reserve as a reserved bucket the one bucket that is not allocated for allocation to a potential new network device;
when a new network device joins the cluster, second allocate to the new network device at least a portion of the port blocks from the reserved bucket; and
use the port blocks for port address translation operations for communications between a first network and a second network that traverse the cluster.

15. The apparatus of claim 14, wherein the processor is further configured to, when the new network device joins the cluster, resulting in N+1 network devices in the cluster:
compute a new number of the port blocks of the pool to be included in each of N+2 buckets of the port blocks, wherein the new number is less than the initial number,
wherein the processor is configured to second allocate by allocating to the new network device at least the new number of the port blocks from the reserved bucket.

16. The apparatus of claim 15, wherein the processor is further configured to, when the new network device joins the cluster:
recall from each of the N network devices that were in the cluster prior to when the new network device joins a respective portion of the respective bucket of the port blocks previously allocated by the first allocating; and reserve the respective portions recalled from the N network devices for allocation to a potential new network device.

17. The apparatus of claim 14, wherein the first network includes a private network and the second network includes a public network.

18. A non-transitory computer readable medium encoded with instructions that, when executed by a processor of a master network device among N network devices of a cluster, cause the processor to perform:

receiving cluster configuration information including a set of Internet Protocol (IP) addresses and a pool of port blocks associated with the IP addresses, each port block including multiple ports, and the pool of the port blocks to be shared across the N network devices;

dividing the port blocks in the pool into N+1 buckets of the port blocks, each bucket including an initial number of the port blocks;

first allocating all but one bucket of the N+1 buckets to corresponding ones of the N network devices;

reserving as a reserved bucket the one bucket that is not allocated for allocation to a potential new network device;

when a new network device joins the cluster, second allocating to the new network device at least a portion of the port blocks from the reserved bucket; and using the port blocks for port address translation operations for communications between a first network and a second network that traverse the cluster.

19. The non-transitory computer readable medium of claim 18, further comprising instructions to cause the processor to perform, when the new network device joins the cluster, resulting in N+1 network devices in the cluster:

computing a new number of the port blocks of the pool to be included in each of N+2 buckets of the port blocks, wherein the new number is less than the initial number, wherein the instructions to cause the processor to perform the second allocating include instructions to cause the processor to perform allocating to the new network device at least the new number of the port blocks from the reserved bucket.

20. The non-transitory computer readable medium of claim 18, wherein the first network includes a private network and the second network includes a public network.

* * * * *